United States Patent
Wang

(10) Patent No.: US 9,750,101 B2
(45) Date of Patent: Aug. 29, 2017

(54) VOLTAGE BOOST DRIVING CIRCUIT FOR LED BACKLIGHT AND LCD DEVICE HAVING SAME

(71) Applicant: SHENZHEN TCL NEW TECHNOLOGY CO., LTD, Shenzhen, Guangdong (CN)

(72) Inventor: Jian Wang, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/039,863

(22) PCT Filed: Dec. 13, 2014

(86) PCT No.: PCT/CN2014/093782
§ 371 (c)(1),
(2) Date: May 27, 2016

(87) PCT Pub. No.: WO2016/041277
PCT Pub. Date: Mar. 24, 2016

(65) Prior Publication Data
US 2017/0006682 A1    Jan. 5, 2017

(30) Foreign Application Priority Data

Sep. 19, 2014 (CN) .......................... 2014 2 0543081

(51) Int. Cl.
*H05B 33/08* (2006.01)
*H05B 37/02* (2006.01)
(Continued)

(52) U.S. Cl.
CPC ....... *H05B 33/0851* (2013.01); *G02F 1/1336* (2013.01); *G09G 3/3406* (2013.01);
(Continued)

(58) Field of Classification Search
CPC ............ H05B 33/0848; H05B 33/0896; H05B 37/0245; H05B 37/0254; H05B 41/3925;
(Continued)

(56) References Cited

U.S. PATENT DOCUMENTS 5,646,570 A * 7/1997 Blodgett ............... H03F 3/1935
327/306
6,972,658 B1 * 12/2005 Findley ............... H01F 17/0006
257/531
(Continued)

FOREIGN PATENT DOCUMENTS

CN         102779486 A       11/2012

OTHER PUBLICATIONS

Translation of CN 102779486 (A), Nov. 14, 2012.*
International Search Report of PCT Patent Application No. PCT/CN2014/093782 dated Jun. 10, 2015.

*Primary Examiner* — Douglas W Owens
*Assistant Examiner* — Syed M Kaiser

(57) ABSTRACT

The present invention provides a voltage boost driving circuit for LED backlight, which includes a first power input port, a second power input port, an LED light bar, a positive boost circuit, a negative boost circuit, and a luminance controlling circuit configured for controlling the luminance of the LED light bar; the first and second power input ports are respectively connected to the positive and negative poles of an external power supply; the positive boost circuit is connected between the first power input port and the positive pole of the LED light bar; the second power input port is connected to the ground; the negative boost circuit is connected to the positive boost circuit via the luminance controlling circuit, an output port of the negative boost circuit is connected to the negative pole of the LED light bar. An LCD device is further provided.

16 Claims, 2 Drawing Sheets

(51) Int. Cl.
*G02F 1/1335* (2006.01)
*G09G 3/34* (2006.01)
(52) U.S. Cl.
CPC ......... *H05B 33/0815* (2013.01); *H05B 37/02* (2013.01); *G09G 2330/024* (2013.01); *Y02B 20/42* (2013.01)
(58) Field of Classification Search
CPC ............. H05B 41/391; H05B 41/2828; H05B 33/0803; H05B 37/0272; H05B 33/0857; H05B 33/0887
USPC ................ 315/315, 299, 276, 297, 302, 307
See application file for complete search history.

(56) References Cited

U.S. PATENT DOCUMENTS

| | | | | |
|---|---|---|---|---|
| 7,043,041 | B2* | 5/2006 | Švajda et al. ........ | H04R 25/554 381/312 |
| 8,581,508 | B2* | 11/2013 | Horino ................ | H02M 1/4225 315/185 S |
| 8,614,553 | B2* | 12/2013 | Barth ................ | H05B 33/0842 315/276 |
| 8,773,085 | B2* | 7/2014 | Kassayan .......... | H02M 3/33569 323/262 |
| 9,078,317 | B1* | 7/2015 | Szolusha ............ | H05B 33/0815 |
| 9,084,320 | B2* | 7/2015 | Yang ................ | H05B 33/0815 |
| 9,271,354 | B2* | 2/2016 | Takahashi .......... | H05B 33/0803 |
| 9,295,117 | B2* | 3/2016 | Acatrinei .......... | H05B 33/0815 |
| 9,380,661 | B2* | 6/2016 | Takahashi .......... | H05B 33/0815 |

* cited by examiner

VOLTAGE BOOST DRIVING CIRCUIT FOR LED BACKLIGHT AND LCD DEVICE HAVING SAME

FIELD OF THE INVENTION

The present invention relates to the field of electronic technology, and in particular, to a voltage boost driving circuit for LED backlight and LCD device having same.

BACKGROUND OF THE INVENTION

Presently, more and more Liquid Crystal Display device (LCD TV for example) adopts LED backlight, which has advantages of long service life, saving power, and easy to drive.

Referring to FIG. 1, it schematically shows a voltage boost driving circuit for LED backlight of an embodiment of prior art. The boost driving circuit includes a first voltage boost unit 10, a second boost unit 20, an electronic switch K, an isolating diode D3, and a control circuit 30. The first voltage boost unit 10 includes a first storage inductor L2, a first diode D2, and a first capacitor C2 connected to the two ends of the input power source U2 in serial. The second voltage boost unit 20 includes a second storage inductor L3, a second diodes D4, and a second capacitor C3 connected in serial, where the second voltage boost unit 20 is connected to the first capacitor C2 in parallel. An end of the electronic switch K is connected to the anode of the second diode D4, another end of the electronic switch K is connected to the negative pole of the input power source U2. The anode of the isolating diode D3 is connected to the anode of the first diodes D2, the cathode of the isolating diode D3 is connected to the anode of the second diode D4. The control circuit 30 includes a PWM control integrated circuit IC2 and a resistor serial connected in parallel with the second capacitor C3, where the resistor serial includes a first resistor R3 and a second resistor R4. The output port of control signal of the PWM control integrated circuit IC2 is connected to the cathode of the isolating diode D3 via the electronic switch K, while the feedback signal input port thereof is connected to the common end of the first resistor R3 and the second resistor R4.

The operating principle of the voltage boost driving circuit for LED backlight is that: when the electronic switch K is turned on, the first voltage boost unit 10 starts to work, and the input power source U2 charges the first storage inductor L2. When the electronic switch K is turned off, the second voltage boost unit 20 starts to work, the first capacitor C2 discharges, and the second storage inductor L3 starts to storage energy so that the voltage added on the second capacitor C3 increases, which further leads a result that the output voltage VO2 meets the voltage requirement of the LED backlight. Specifically, when the electronic switch K is turned off, the output port of control signal of the PWM control integrated circuit IC2 is connected to the cathode of the isolating diodes D3. When the electronic switch K is turned on, the connection between the output port of control signal of the PWM control integrated circuit IC2 and the cathode of the isolating diodes D3 is disconnected. In the present embodiment of the voltage boost driving circuit for LED backlight, the voltage boost value can be adjusted via controlling the duty ratio of PWM signal from the PWM control integrated circuit IC2 of the control circuit 30. When the electronic switch K is turned on, the first storage inductor L2, the isolating diode D3, and the electronic switch K constitute a loop. The voltage between the two ends of the first storage inductor L2 equals to the voltage of the input power source U2, so that the input power source U2 charges the first storage inductor L2. In the meantime, the voltage between the two ends of the second storage inductor L3 equals to the voltage UC2 of the first capacitor C2, the voltage UC2 therefore charges the second storage inductor L3. When the electronic switch K is turned off, the overlapped voltage of the energy stored in the first storage inductor L2 and the input power source U2 discharges to the first capacitor C2, so that the voltage UC2 of the first capacitor C2 is increased. At the same time, the overlapped voltage of the energy stored in the second storage inductor L3 and the boosted voltage UC2 discharges to the second capacitor C3, so that the output voltage UC3 of the second capacitor C3 multiples the voltage of the input power source U2. During the boosting process, when the electronic switch K performs the operation of on and off, the voltage boost results of the first voltage boost unit 10 and the second voltage boost unit 20 are independent from each other due to the existence of the isolating diodes D3. After the boost step described above, if the first voltage boost unit 10 increases the input voltage of the input power source U2 by 5 times, the second voltage boost unit 20 also increases the output voltage of the first voltage boost unit 10 by 5 times, which means the voltage boost driving circuit for LED backlight increases the input voltage of the input power source U2 by 25 times. Regarding each boost time of the first voltage boost unit 10 and the second voltage boost unit 20, those who skilled in the art would how to adjust it by adjusting the divider resistance or other means having the same function.

Although the LED light bar of voltage boost driving circuit for LED backlight shown in FIG. 1 can fulfill the driving requirement of LED light bar of high voltage, for LED light bar of side-style, when the voltage added to the LED light bar is too high, the voltage of the LED light bar relative to the ground is also high, which results in potential risk.

SUMMARY OF THE INVENTION

The present invention aims to fulfill the high voltage requirement of the LED light bar LB, and reduce the voltage of the LED light bar BL related to the ground.

An embodiment of the present invention provides a voltage boost driving circuit for LED backlight, comprising a first power input port, a second power input port, an LED light bar, a positive boost circuit configured for providing a positive voltage to a positive pole of the LED light bar, a negative boost circuit configured for providing a negative voltage to a negative pole of the LED light bar, and a luminance controlling circuit configured for controlling the luminance of the LED light bar; wherein:

the first power input port and the second power input port are respectively connected to the positive and negative poles of an external power supply; the positive boost circuit is connected between the first power input port and the positive pole of the LED light bar; the second power input port is connected to the ground; the negative boost circuit is connected to the positive boost circuit via the luminance controlling circuit, an output port of the negative boost circuit is connected to the negative pole of the LED light bar.

Preferably, the positive boost circuit comprises a first coupling inductor, a first diode, a first electrolytic capacitor, and a first electronic switch; where:

a first end of the first coupling inductor is connected to the first power input port, a second end of the first coupling inductor is connected to the anode of the first diode; the cathode of the first diode is connected to a positive pole of the electrolytic capacitor and the positive pole of the LED light bar; a negative pole of the electrolytic capacitor is connected the ground; an end of the first electronic switch is connected to the anode of the first diode, another end of the first electronic switch is connected to the ground, a controlling end of the first electronic switch is connected to the luminance controlling circuit.

Preferably, the negative boost circuit comprises a second coupling inductor, a second diode, a third diode, a second electrolytic capacitor, and a third electrolytic capacitor; where:

a first end of the second coupling inductor is connected to the negative pole of the second electrolytic capacitor and the positive pole of the third electrolytic capacitor, a second end of the second coupling inductor is connected to the anode of the second diode and the cathode of the third diode; the cathode of the second diode is connected to the positive pole of the second electrolytic capacitor; the negative pole of the third electrolytic capacitor is connected to the anode of the third diode and the negative pole of the LED light bar; the positive pole of the second electrolytic capacitor is also connected to the luminance controlling circuit.

Preferably, the luminance controlling circuit comprises a PWM control integrated circuit, a sampling resistor, and a second electronic switch; where:

an end of the sampling resistor is connected to the negative pole of the first electrolytic capacitor, another end of the sampling resistor is connected to a feedback signal input port of the PWM control integrated circuit and a first end of the second electronic switch; a second end of the second electronic switch is connected to the positive pole of the second electrolytic capacitor, a controlling end of the second electronic switch is connected to a first controlling signal output port of the PWM control integrated circuit.

Preferably, the controlling port of the first electronic switch is connected to a second controlling signal output port of the PWM control integrated circuit.

Preferably, the first coupling inductor and the second coupling inductor are respectively a primary coil and a secondary coil of a transformer; the first end of the first coupling inductor corresponds to a synonym end of the primary coil, the second end of the first coupling inductor corresponds to a homonym end of the primary coil; the first end of the second coupling inductor corresponds to a homonym end of the secondary coil, the second end of the second coupling inductor corresponds to a synonym end of the secondary coil.

Preferably, the coil numbers of the first coupling inductor is the same as the coil numbers of the second coupling inductor.

Preferably, the voltage of the two ends of the first electrolytic capacitor equals to the sum of the voltage of the two ends of the second electrolytic capacitor and the voltage of the two ends of the third electrolytic capacitor.

The present invention further provides an LCD device, comprising a voltage boost driving circuit for LED backlight, which comprises a first power input port, a second power input port, an LED light bar, a positive boost circuit configured for providing a positive voltage to a positive pole of the LED light bar, a negative boost circuit configured for providing a negative voltage to a negative pole of the LED light bar, and a luminance controlling circuit configured for controlling the luminance of the LED light bar; wherein:

the first power input port and the second power input port are respectively connected to the positive and negative poles of an external power supply; the positive boost circuit is connected between the first power input port and the positive pole of the LED light bar; the second power input port is connected to the ground; the negative boost circuit is connected to the positive boost circuit via the luminance controlling circuit, an output port of the negative boost circuit is connected to the negative pole of the LED light bar.

The voltage boost driving circuit for LED backlight of the present embodiment includes a first power input port, a second power input port, an LED light bar, a positive boost circuit, a negative boost circuit, and a luminance controlling circuit configured for controlling the luminance of the LED light bar; the first power input port and the second power input port are respectively connected to the positive and negative poles of an external power supply; the positive boost circuit is connected between the first power input port and the positive pole of the LED light bar; the second power input port is connected to the ground; the negative boost circuit is connected to the positive boost circuit via the luminance controlling circuit, an output port of the negative boost circuit is connected to the negative pole of the LED light bar. The present invention further provided an LCD device. In the voltage boost driving circuit for LED backlight of the present embodiment, the positive boost circuit provides a positive voltage for the positive pole of the LED light bar BL, the negative boost circuit provides a negative voltage symmetric with the positive voltage for the negative pole of the LED light bar BL, so that the voltage boost driving circuit for LED backlight of the present embodiment not only fulfills the high voltage requirement of the LED light bar LB, but also reduces the voltage of the LED light bar BL related to the ground, which is relatively safe. Meanwhile, the voltage boost driving circuit for LED backlight of the present embodiment has the advantages of simple structure and easy to implement.

DETAILED DESCRIPTION OF THE EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present invention also all within the protection scope of the present invention.

One embodiment of the present invention provides a voltage boost driving circuit for LED backlight.

Figure 1:
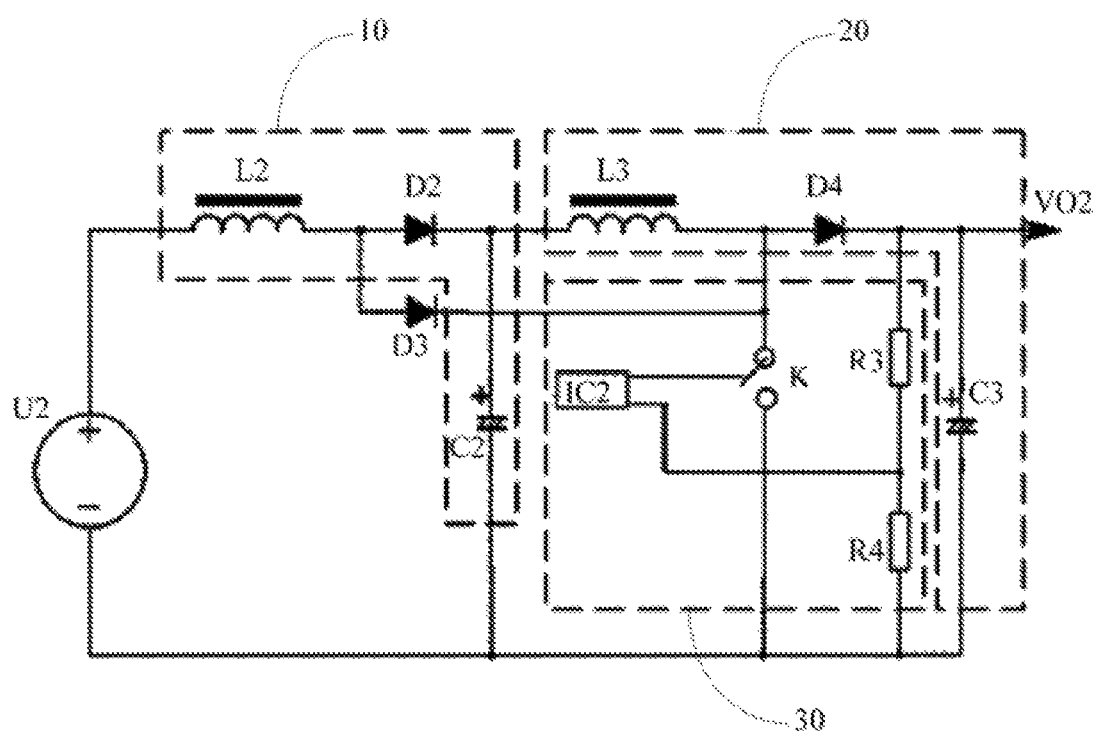
FIG. 1 is a schematic structure view of a voltage boost driving circuit for LED backlight of an embodiment of prior art.
Figure 2:
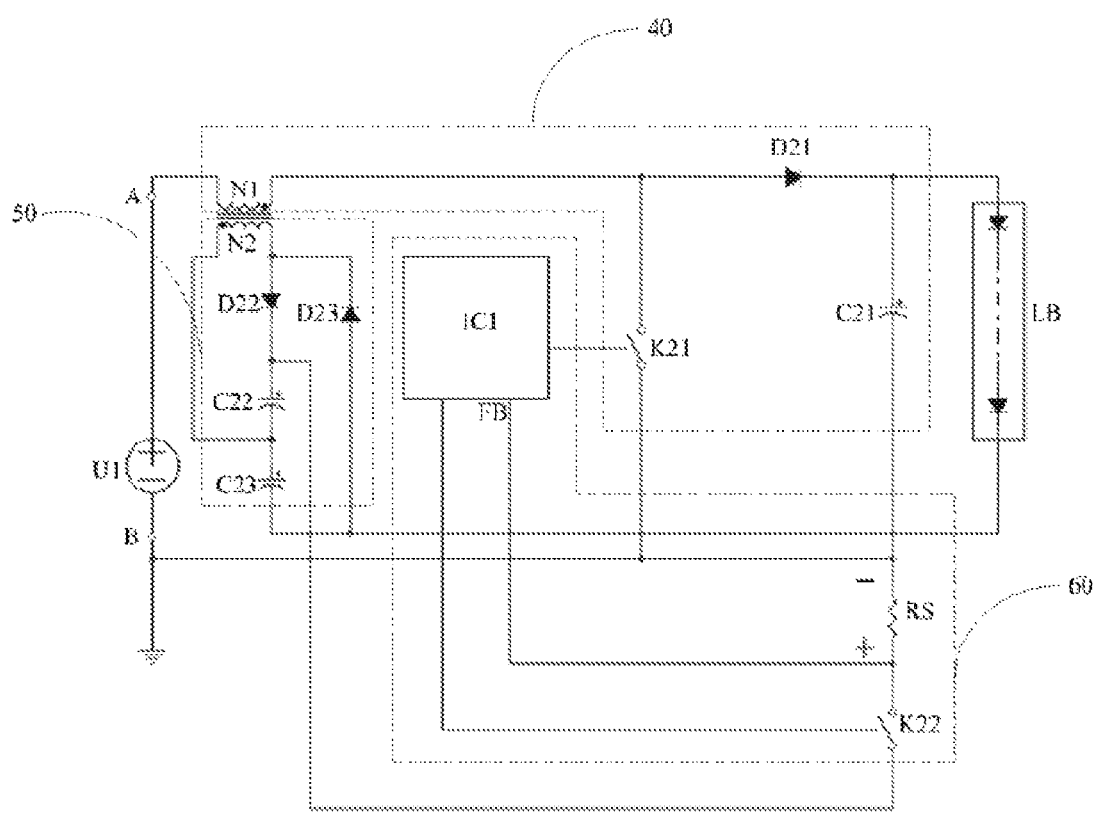
FIG. 2 is a schematic structure view of a voltage boost driving circuit for LED backlight of an embodiment of the present invention.

Referring to FIG. 2, it schematically shows a structure view of a voltage boost driving circuit for LED backlight of an embodiment of the present invention.

In the present embodiment, the voltage boost driving circuit for LED backlight includes a first power input port A, a second power input port B, an LED light bar LB, a positive boost circuit 40, a negative boost circuit 50, and a luminance controlling circuit 60 configured for controlling the luminance of the LED light bar LB.

Wherein the first power input port A and the second power input port B are configured for providing power to the voltage boost driving circuit for LED backlight of the present embodiment;

the positive boost circuit 40 is configured for providing a positive voltage to the positive pole of the LED light bar LB;

the negative boost circuit 50 is configured for providing a negative voltage to the negative pole of the LED light bar LB;

the luminance controlling circuit 60 is configured for controlling the luminance of the LED light bar LB.

Specifically, the first power input port A is connected to the positive pole of an external power supply U1, the second power input port B is connected to the negative pole of the external power supply U1. The positive boost circuit 40 is connected between the first power input port A and the positive pole of the LED light bar LB. The second power input port B is connected to the ground. The negative boost circuit 50 is connected to the positive boost circuit 40 via the luminance controlling circuit 60. An output port of the negative boost circuit 50 is connected to the negative pole of the LED light bar LB.

Wherein, the positive boost circuit 40 includes a first coupling inductor N1, a first diode D1, a first electrolytic capacitor C21, and a first electronic switch K21;

Specifically, the first end of the first coupling inductor N1 is connected to the first power input port A, a second end of the first coupling inductor N1 is connected to the anode of the first diode D1; the cathode of the first diode D1 is connected to a positive pole of the electrolytic capacitor C21 and the positive pole of the LED light bar LB; a negative pole of the electrolytic capacitor C21 is connected the ground; an end of the first electronic switch K21 is connected to the anode of the first diode D1, another end of the first electronic switch K21 is connected to the ground, a controlling end of the first electronic switch K21 is connected to the luminance controlling circuit 60.

The negative boost circuit 50 includes a second coupling inductor N2, a second diode D22, a third diode D23, a second electrolytic capacitor C22, and a third electrolytic capacitor C23.

Specifically, a first end of the second coupling inductor N2 is connected to the negative pole of the second electrolytic capacitor C22 and the positive pole of the third electrolytic capacitor C23, a second end of the second coupling inductor N2 is connected to the anode of the second diode D22 and the cathode of the third diode D23; the cathode of the second diode D22 is connected to the positive pole of the second electrolytic capacitor C22; the negative pole of the third electrolytic capacitor C23 is connected to the anode of the third diode D23 and the negative pole of the LED light bar LB; the positive pole of the second electrolytic capacitor C22 is also connected to the luminance controlling circuit 60.

The luminance controlling circuit 60 comprises a PWM control integrated circuit IC1, a sampling resistor RS, and a second electronic switch K22.

Specifically, an end of the sampling resistor RS is connected to the negative pole of the first electrolytic capacitor C21, another end of the sampling resistor RS is connected to a feedback signal input port FB of the PWM control integrated circuit IC1 and a first end of the second electronic switch K22; a second end of the second electronic switch K22 is connected to the positive pole of the second electrolytic capacitor C22, a controlling end of the second electronic switch K22 is connected to a first controlling signal output port (not shown) of the PWM control integrated circuit IC1.

In the present embodiment, the controlling port of the first electronic switch K21 is connected to a second controlling signal output port (not shown) of the PWM control integrated circuit IC1.

In the present embodiment, the first coupling inductor N1 and the second coupling inductor N2 are respectively a primary coil and a secondary coil of a transformer; wherein the first end of the first coupling inductor N1 corresponds to a synonym end of the primary coil, the second end of the first coupling inductor N1 corresponds to a homonym end of the primary coil; the first end of the second coupling inductor N2 corresponds to a homonym end of the secondary coil, the second end of the second coupling inductor N2 corresponds to a synonym end of the secondary coil. Further, in the present embodiment, the coil numbers of the first coupling inductor N1 is the same as the coil numbers of the second coupling inductor N2.

In the voltage boost driving circuit for LED backlight of the present embodiment, the positive boost circuit 40 is a typically BOOST circuit, the BOOST circuit boosts the positive voltage related to the ground, the boosted voltage is then output to the positive pole of the LED light bar BL (namely, the positive boost circuit 40 provides a positive voltage for the positive pole of the LED light bar BL); the negative boost circuit 50 boosts the negative voltage related to the ground, the boosted voltage is then output to the negative pole of the LED light bar BL (namely, the negative boost circuit 50 provides a negative voltage for the negative pole of the LED light bar BL). In the present embodiment, a positive sampling voltage provided from the two ends of the sampling resistor RS is input to the feedback signal input port FB of the PWM control integrated circuit IC1, the PWM control integrated circuit IC1 outputs a corresponding controlling signal according to the voltage input to the feedback signal input port FB, so as to control the first electronic switch K21 and the second electronic switch K22. In the present embodiment, as the coil numbers of the first coupling inductor N1 is the same as the coil numbers of the second coupling inductor N2, the voltage VC21 of the two ends of the first electrolytic capacitor C21 of the positive boost circuit 40 equals to the sum of the voltage VC22 of the two ends of the second electrolytic capacitor C22 and the voltage VC23 of the two ends of the third electrolytic capacitor C23 (namely, $VC21=VC22+VC23$, where $VC21=U1+VN1$, $VC22=U1$, $VC23=VN1$). In the present embodiment, the negative boost circuit 50 controls the second electronic switch K22 and the sampling resistor RS of the luminance controlling circuit 60 to connect to the positive boost circuit 40 in serial, while the LED light bar LB is connected between the output port of the positive boost circuit 40 and the output port of the negative boost circuit 50.

In the voltage boost driving circuit for LED backlight of the present embodiment, the positive boost circuit 40 provides a positive voltage for the positive pole of the LED light bar BL, the negative boost circuit 50 provides a negative voltage symmetric with the positive voltage for the negative pole of the LED light bar BL, so that the voltage boost driving circuit for LED backlight of the present embodiment not only fulfills the high voltage requirement of the LED light bar LB, but also reduces the voltage of the LED light bar BL related to the ground by 50 percent.

The voltage boost driving circuit for LED backlight of the present embodiment includes a first power input port A, a second power input port B, an LED light bar LB, a positive boost circuit 40, a negative boost circuit 50, and a luminance controlling circuit 60 configured for controlling the luminance of the LED light bar LB; the first power input port A and the second power input port B are respectively connected to the positive and negative poles of an external power supply U1; the positive boost circuit 40 is connected between the first power input port and the positive pole of the LED light bar LB; the second power input port B is connected to the ground; the negative boost circuit 50 is connected to the positive boost circuit 40 via the luminance controlling circuit 60, an output port of the negative boost circuit 50 is connected to the negative pole of the LED light bar LB. In the voltage boost driving circuit for LED backlight of the present embodiment, the positive boost circuit 40 provides a positive voltage for the positive pole of the LED light bar BL, the negative boost circuit 50 provides a negative voltage symmetric with the positive voltage for the negative pole of the LED light bar BL, so that the voltage boost driving circuit for LED backlight of the present embodiment not only fulfills the high voltage requirement of the LED light bar LB, but also reduces the voltage of the LED light bar BL related to the ground, which is relatively safe. Meanwhile, the voltage boost driving circuit for LED backlight of the present embodiment has the advantages of simple structure and easy to implement.

The present invention further provided an LCD device. The LCD device includes a voltage boost driving circuit for LED backlight. The structure of the voltage boost driving circuit for LED backlight can refer to the above embodiment and will not be described again here. As the LCD device has the voltage boost driving circuit for LED backlight, it should be understood that the LCD device therefore has all the benefits described above.

The above-mentioned is only preferred embodiments of the invention, and shall not be regarded as limitations of the patent range of the invention. All equivalent structures or flow transformations and modifications or direct or indirect applications.

What is claimed is:

1. A voltage boost driving circuit for LED backlight, comprising:
    a first power input port;
    a second power input port;
    a LED light bar;
    a positive boost circuit configured for providing a positive voltage to a positive pole of the LED light bar;
    a negative boost circuit configured for providing a negative voltage to a negative pole of the LED light bar; and
    a luminance controlling circuit configured for controlling the luminance of the LED light bar, wherein:
    the first power input port and the second power input port are respectively connected to the positive pole and negative pole of an external power supply; the positive boost circuit is connected between the first power input port and the positive pole of the LED light bar; the second power input port is connected to the ground; the negative boost circuit is connected to the positive boost circuit via the luminance controlling circuit, an output port of the negative boost circuit is connected to the negative pole of the LED light bar; wherein the positive boost circuit comprises a first coupling inductor; the negative boost circuit comprises a second coupling inductor; wherein the first coupling inductor and the second coupling inductor are respectively a primary coil and a secondary coil of a transformer, a first end of the first coupling inductor corresponds to a synonym end of the primary coil, a second end of the first coupling inductor corresponds to a homonym end of the primary coil, a first end of the second coupling inductor corresponds to a homonym end of the secondary coil, and a second end of the second coupling inductor corresponds to a synonym end of the secondary coil.

2. The voltage boost driving circuit according to claim 1, wherein the positive boost circuit further comprises a first diode, a first electrolytic capacitor, and a first electronic switch; where
    the first end of the first coupling inductor is connected to the first power input port, the second end of the first coupling inductor is connected to the anode of the first diode; the cathode of the first diode is connected to a positive pole of the electrolytic capacitor and the positive pole of the LED light bar; a negative pole of the electrolytic capacitor is connected the ground; an end of the first electronic switch is connected to the anode of the first diode, another end of the first electronic switch is connected to the ground, a controlling end of the first electronic switch is connected to the luminance controlling circuit.

3. The voltage boost driving circuit according to claim 1, wherein the negative boost circuit further comprises a second diode, a third diode, a second electrolytic capacitor, and a third electrolytic capacitor; where
    the first end of the second coupling inductor is connected to the negative pole of the second electrolytic capacitor and the positive pole of the third electrolytic capacitor, the second end of the second coupling inductor is connected to the anode of the second diode and the cathode of the third diode; the cathode of the second diode is connected to the positive pole of the second electrolytic capacitor; the negative pole of the third electrolytic is connected to the anode of the third diode and the negative pole of the LED light bar; the positive pole of the second electrolytic capacitor is also connected to the luminance controlling circuit.

4. The voltage boost driving circuit according to claim 2, wherein the negative boost circuit further comprises a second diode, a third diode, a second electrolytic capacitor, and a third electrolytic capacitor; where
    the first end of the second coupling inductor is connected to the negative pole of the second electrolytic capacitor and the positive pole of the third electrolytic capacitor, the second end of the second coupling inductor is connected to the anode of the second diode and the cathode of the third diode; the cathode of the second diode is connected to the positive pole of the second electrolytic capacitor; the negative pole of the third electrolytic capacitor is connected to the anode of the third diode and the negative pole of the LED light bar; the positive pole of the second electrolytic is also connected to the luminance controlling circuit.

5. The voltage boost driving circuit according to claim 4, wherein the luminance controlling circuit comprises a PWM control integrated circuit, a sampling resistor, and a second electronic switch; where
    an end of the sampling resistor is connected the negative pole of the first electrolytic capacitor, another end of the sampling resistor is connected to a feedback input port of the PWM control integrated circuit and a first end of the second electronic switch; a second end of the second electronic switch is connected to the positive pole of the second electrolytic capacitor, a controlling end of the second electronic switch is connected to a first controlling signal output port of the PWM control integrated circuit.

6. The voltage boost driving circuit according to claim 5, wherein the controlling port of the first electronic switch is connected to a second controlling signal output port of the PWM control integrated circuit.

7. The voltage boost driving circuit according to claim 1, wherein the coil numbers of the first coupling inductor and the second coupling inductor are the same.

8. The voltage boost driving circuit according to claim 7, wherein the voltage of the two ends of the first electrolytic capacitor equals to the sum of the voltage of the two ends of the second electrolytic capacitor and the voltage of the two ends of the third electrolytic capacitor.

9. A LCD device, comprising a voltage boost driving circuit for LED backlight, which comprises:
a first power input port;
a second power input port;
a LED light bar;
a positive boost circuit configured for providing a positive voltage to a positive pole of the LED light bar;
a negative boost circuit configured for providing a negative voltage to a negative pole of the LED light bar; and
a luminance controlling circuit configured for controlling the luminance of the LED light bar, wherein:
the first power input port and the second power input port are respectively connected to the positive pole and negative pole of an external power supply; the positive boost circuit is connected between the first power input port and the positive pole of the LED light bar; the second power input port is connected to the ground; the negative boost circuit is connected to the positive boost circuit via the luminance controlling circuit, a output port of the negative boost circuit is connected to the negative pole of the LED light bar; wherein the positive boost circuit comprises a first coupling inductor; the negative boost circuit comprises a second coupling inductor; wherein the first coupling inductor and the second coupling inductor are respectively a primary coil and a secondary coil of a transformer, a first end of the first coupling inductor corresponds to a synonym end of the primary coil, a second end of the first coupling inductor corresponds to a homonym end of the primary coil, a first end of the second coupling inductor corresponds to a homonym end of the secondary coil, and a second end of the second coupling inductor corresponds to a synonym end of the secondary coil.

10. The LCD device according to claim 9, wherein the positive boost circuit further comprises a first diode, a first electrolytic capacitor, and a first electronic switch; where
the first end of the first coupling inductor is connected to the first power input port, the second end of the first coupling inductor is connected to the anode of the first diode; the cathode of the first diode is connected to a positive pole of the electrolytic capacitor and the positive pole of the LED light bar; a negative pole of the electrolytic capacitor is connected the ground; an end of the first electronic switch is connected to the anode of the first diode, another end of the first electronic switch is connected to the ground, a controlling end of the first electronic switch is connected to the luminance controlling circuit.

11. The LCD device according to claim 9 wherein the negative boost circuit further comprises a second diode, a third diode, a second electrolytic capacitor, and a third electrolytic capacitor; where
the first end of the second coupling inductor is connected to the negative pole of the second electrolytic capacitor and the positive pole of the third electrolytic capacitor, the second end of the second coupling inductor is connected to the anode of the second diode and the cathode of the third diode; the cathode of the second diode is connected to the positive pole of the second electrolytic capacitor; the negative pole of the third electrolytic is connected to the anode of the third diode and the negative pole of the LED light bar; the positive pole of the second electrolytic capacitor is also connected to the luminance controlling circuit.

12. The LCD device according to claim 10, wherein the negative boost circuit further comprises a second diode, a third diode, a second electrolytic capacitor, and a third electrolytic capacitor; where
the first end of the second coupling inductor is connected to the negative pole of the second electrolytic capacitor and the positive pole of the third electrolytic capacitor, the second end of the second coupling inductor is connected to the anode of the second diode and the cathode of the third diode; the cathode of the second diode is connected to the positive pole of the second electrolytic capacitor; the negative pole of the third electrolytic capacitor is connected to the anode of the third diode and the negative pole of the LED light bar; the positive pole of the second electrolytic is also connected to the luminance controlling circuit.

13. The LCD device according to claim 12, wherein the luminance controlling circuit comprises a PWM control integrated circuit, a sampling resistor, and a second electronic switch; where
an end of the sampling resistor is connected the negative pole of the first electrolytic capacitor, another end of the sampling resistor is connected to a feedback input port of the PWM control integrated circuit and a first end of the second electronic switch; a second end of the second electronic switch is connected to the positive pole of the second electrolytic capacitor, a controlling end of the second electronic switch is connected to a first controlling signal output port of the PWM control integrated circuit.

14. The LCD device according to claim 13, wherein the controlling port of the first electronic switch is connected to a second controlling signal output port of the PWM control integrated circuit.

15. The LCD device according to claim 9, wherein the coil numbers of the first coupling inductor and the second coupling inductor are the same.

16. The LCD device according to claim 15, wherein the voltage of the two ends of the first electrolytic capacitor equals to the sum of the voltage of the two ends of the second electrolytic capacitor and the voltage of the two ends of the third electrolytic capacitor.

* * * * *